UNITED STATES PATENT OFFICE.

WARREN H. GOULD, OF MANCHESTER, NEW HAMPSHIRE.

PAINT AND CALKING COMPOSITION.

SPECIFICATION forming part of Letters Patent No. 644,170, dated February 27, 1900.

Application filed September 28, 1899. Serial No. 731,967. (No specimens.)

*To all whom it may concern:*

Be it known that I, WARREN H. GOULD, a citizen of the United States, residing at Manchester, in the county of Hillsborough and State of New Hampshire, have invented a new and useful Paint or Cement Composition, of which the following is a specification.

The object of this invention is to produce a compound in the nature of a paint and cement intended particularly for use in repairing concrete and asphalt pavements and roofs composed of tin, iron, or wood. The said paint or cement, however, is not limited to the uses above named, but is equally well adapted for use in connection with the inside and outside work of buildings and for stopping leaks of all descriptions in sidewalks, buildings, the hulls of boats, &c.

The composition consists of the following ingredients combined in or about the proportions stated, namely: boiled linseed-oil, four quarts; paint-skins, four quarts; Prince's metallic, four pounds; mineral or Venetian red, one pound; pitch, one quart; soapstone-dust, four pounds.

In order to make the compound suitable for use as a cement, the proportions of the pitch and soapstone-dust are increased in proportion to the stiffness and elasticity which it is desired to impart to the composition.

The ingredients are combined as follows: The linseed-oil is placed over a fire and boiled, and after reaching the boiling-point the paint-skins are placed therein and stirred until dissolved. The liquid is then strained and the Prince's metallic, mineral or Venetian red, soapstone-dust, and pitch are added. The product when cool forms an excellent paint, which may be applied with the aid of a brush, and is especially useful upon the walls of buildings and upon roofs, the paint having sufficient body to stop all leaks and at the same time having sufficient toughness and elasticity to adhere closely to the roof. The elastic qualities of the paint never become impaired, and there is no danger of the paint drying up and cracking or peeling off. To thicken the paint sufficiently to render it useful as a cement, an additional amount of soapstone-dust and pitch are added, which produces a composition which is pliable, tough, and sticky and which will serve admirably to retain in place slates employed in roofing a building. It is also adapted for use in repairing cracks in sidewalks and the walls of a building and also to stop leaks in the hulls of vessels. In repairing sidewalks the cracks are pointed up with the cement, after which soapstone-dust is spread over the filled cracks and the surplus dust afterward swept away.

The life, tenacity, and binding or adhesive properties of the paint-skins are retained when the skins are dissolved in the boiled linseed-oil, and the product will not crack and peel off, as would be the case were the skins treated with potash or soda.

The soapstone-dust which is used in the composition above described is preferably bolted very fine or in the form of an impalpable powder.

Prince's metallic is a substance composed of seventy-two per cent. of oxid of iron and twenty-eight per cent. of hydraulic cement.

Having thus described the invention, what is claimed as new, and desired to be secured by Letters Patent, is—

The herein-described composition of matter to be used as a paint or cement, consisting of paint-skins dissolved in boiled linseed-oil, to which are added Prince's metallic, mineral red, pitch, and soapstone-dust, substantially as described.

In testimony that I claim the foregoing as my own I have hereto affixed my signature in the presence of two witnesses.

WARREN H. GOULD.

Witnesses:
   GEO. A. BAILEY,
   MOODYBELL S. BENNETT.